United States Patent Office 3,437,453
Patented Apr. 8, 1969

3,437,453
RECOVERY OF SELENIUM CATALYSTS USING CONCENTRATED AQUEOUS SALT SOLUTIONS
Joseph Serpinet, Sainte-Foy-les-Lyon, France, assignor to Ugine Kuhlmann, Paris, France, a corporation of France
No Drawing. Filed Apr. 21, 1966, Ser. No. 544,072
Claims priority, application France, Apr. 26, 1965, 14,602
Int. Cl. B01j 9/20; C01b 19/00
U.S. Cl. 23—312          13 Claims This invention relates to improvements in the production of ethylenic acids by oxidation of unsaturated aldehydes in an organic medium, in the presence of selenium compounds as catalysts. More particularly it relates to recovery of the selenium catalyst from the organic or reaction medium.

The production of ethylenic acids from unsaturated aldehydes utilizes hydrogen peroxide or other peroxides as oxidizing agents and generally leads to solutions containing about, by weight, 10% to 40% unsaturated acid, 5% to 20% water, 0.2% to 4% selenium oxide, with the remainder comprising the solvent, such as tertiary-butanol, and small amounts of untransformed aldehyde, peroxide and various oxidation products.

By comparison with the organic compounds utilized, selenium is costly so that recovery of most of it is essential for the economy of the process. However, selenium separation from the complex organic medium which results from the aldehyde oxidation is a difficult problem, and it is not surprising that numerous solutions of the problem have been proposed.

For instance, one proposal includes distilling all the volatile compounds and in particular the unsaturated acid. The selenium is then found in the distillation residue, partly reduced into the non-metal and mixed with tars primarily of polymers. The difficulty lies in separation of the polymers from the partly reduced selenium oxides despite partial solubility of the polymers in water and in filtering the viscous organic compounds. Furthermore, the removed selenium must be reoxidized in a separate operation, and this can be difficult in the presence of organic residues or where the non-metal has passed into the state of grey selenium which is less reactive.

Another proposal comprises roasting the raw distillation residue, but this method encounters the volatility of the selenium oxides and the different volatility of the selenium itself. Furthermore, it is difficult to prevent local reduction of a part of the selenium oxide in the presence of organic vapors which result from the roasting. Also, the metallic selenium vapors tend to condense in different parts of the apparatus as adhesive deposits which are difficult to recover.

The use of ion-exchanging resins has also been suggested to separate the selenium as an oxide from the raw solution of the acrolein oxidation. Shortcomings of this proposal arise from the organic acidity which is high enough to lead to either a bad selenium recovery, or a loss of unsaturated acid. Moreover, these resins are generally formed of organic polymers which necessarily possess some reducing properties, so that a reduction of a portion of the selenium in the resin can be encountered, thereby preventing recovery of that portion of the selenium.

The selenium recovery is also fundamentally possible by reduction of the non-metallic oxide to elemental selenium, followed by a filtration and a further reoxidation. However, this requires an economic reducing agent which reduces the selenium oxide to a filterable state, without affecting the unsaturated acid present and without leaving a by-product which can spoil a suitable distillation of the unsaturated acid. The sulphurous gas commonly used in chemical analysis does not fulfill either of these conditions. Effectively, the selenium precipitation passes through the intermediary state of a colloid and of selenothionic derivates. Also, it is not instantaneous and secondarily leads to sulphuric acid which must be eliminated. Finally, the previous partial distillation of the organic medium does not improve the reduction and precipitation outputs of the elementary selenium. The elimination of the most volatile components, despite the selenium concentration involved, does not make easier precipitation of selenium by a reducing agent such as sulphurous gas. This invention which obviates most of the above-mentioned disadvantages, in process for extracting the selenium derivatives used in a soluble form as a catalyst in the organic oxidation of an ethylenic aldehyde into an unsaturated acid. The derivatives are present in a soluble form in the medium resulting from the reaction, and the process comprises treating this medium by an aqueous solution of inorganic salts and recovering the selenium entrained in the saline aqueous phase formed in the treating.

I have found that highly concentrated aqueous solutions of inorganic salts are immiscible with the organic medium resulting from the acrolein oxidation, despite the highly hydrophilic property of this medium. Also, the selenium as an oxide passes preferentially into the saline aqueous solution or phase, while almost all the unsaturated acid remains in the organic medium.

Among the inorganic salts which give a high salting out there are ammonium sulphate, sodium chloride, calcium chloride, magnesium chloride and mixtures thereof. It is advantageous to use these salts because they are common and not very costly, but they have not a specific effect and most very soluble inorganic salts such as halogenides, sulphates, nitrates and phosphates, are also advisable.

It is advantageous that the salt concentration of the aqueous solutions be as high as possible in order to limit the organic acid solubility. Accordingly, solutions saturated with highly soluble salts such as ammonium sulphate, calcium or magnesium chlorides are preferred. However, the possibility of recovering the small amounts of unsaturated organic acid, dissolved in an unsaturated aqueous saline solution by recycling or counter-extraction renders such unsaturated solution satisfactory. The dilution limit which can be accepted for the saline extraction solution varies according to the salts, taking into account the disadvantage of introducing large quantities of water in the organic phase or of the solubility of the salt in the wet solvents. With saline solutions of low concentration, the "salt effect" of the dissolved selenium may usefully contribute to limit the aqueous solubility of the unsaturated organic salt. Also, solutions containing a mixture of several salts may be utilized.

The amounts of the saline solutions used are as small as possible to render easier further recycling of the extracted selenium. Extractions have been carried out with volumes of aqueous phase varying from one tenth to one volume of the organic phase; however, these amounts are not limitative.

It is advantageous that the selenium be in the oxidized state, so that adequate oxidation conditions must be used.

To carry out the process, it suffices to contact, by any known means, the saline solution and the reaction medium from the oxidation of an unsaturated aldehyde in the presence of selenium compounds as catalysts. This makes it possible to carry out either a simple extraction, or a counter-flow operation corresponding to a set of extraction plate. Thus a saline aqueous phase containing the major part of selenium and a very small amount of unsaturated acid, and an organic phase containing the major part of the unsaturated acid and organic compounds are obtained. After separation of the two phases, the selenium contained in the aqueous phase is recovered.

The process includes recovery of the selenium by precipitating it in the elementary state through reduction, with sulphurous gas. The selenium is also precipitated barium selenite, or as a selenite of a heavy metal which is insoluble in an alkaline medium, whereby the selenium acid is easily recovered.

The invention includes recovery of the selenium which has passed into the saline phase by a counter-extraction with an organic solvent. It is advantageous, for such an operation, to use the solvent utilized in the ethylenic aldehyde oxidation in liquid phase, from which solvent the soluble selenium has been extracted by the saline solution.

Extraction of the selenium derivative from a dissolving medium such as tertiary-butanol is facilitated by the presence of an organic acid during the operation, while the counter-extraction with tertiary-butanol from an aqueous phase is facilitated by the absence of an organic acid.

Thus, the counter-extraction with tertiary-butanol, acidified or not with an inorganic acid is preferable for the recovery of selenium contained in the saturated solution. Besides, this operation has the advantage of recovery of the small amount of the organic acid entrained in the saline phase. Accordingly, the selenium and the unsaturated acid extracted from the saline aqueous phase are dissolved in the tertiary-butanol and may be recycled in the oxidation reactor. If the selenium concentration in the tertiary-butanol is insufficient, the solution may be concentrated by evaporation. Also, the saline solution volume is reduced by the evaporation, possibly accompanied by a salt precipitation, which increases the selenium concentration in the aqueous phase and thereafter in the organic phase.

The quantity of used solvent depends on the nature of salt and the selected counter-extraction method in one or several stages. With several stages, the process enables one to obtain a good output with a minimum of solvent. It is to be desired that the selenium oxide concentration in the solvent after counter-extraction be not inferior to the one that a good catalytic oxidation of the unsaturated aldehyde requires. In the opposite case, it is necessary to concentrate by evaporation the solution obtained from selenium oxide before recycling. Lastly, the solvent being generally partly miscible with water, there is a maximum quantity of this solvent which must not be exceeded because beyond this quantity the aqueous phase is dehydrated by the solvent whereas the salts precipitate. This phenomenon enables one another embodiment which will be explained further.

Despite the obvious advantages it presents, tertiary-butanol is not the only solvent utilizable for the counter-extraction. Numerous organic solvents which dissolve the selenium oxides, such as some alcohols, ethers, acids, phenols and aromatic hydrocarbons may be used. Free selenium can also be counter-extracted owing to its appreciable and well known solubility in hot solvents, such as carbon disulphide, chlorobenzenes or nitrobenzene.

Regarding the sodium sulphate solution, 1.7 cm.$^3$ tertiary-butanol is added to 1 cm.$^3$ of the saturated solution at 25° C. to preciptiate all the sodium sulphate in the state as a hydrated sulphate; then, by mere filtering, a homogeneous organic liquid containing a little water and all the selenium is obtained.

This property is common to most inorganic salts soluble in an aqueous medium and insoluble in an organic medium. But it is very interesting with salts giving stable hydrates which are but little soluble because it is sufficient to add a little quantity of an alcohol to precipitate hydrate and give an homogeneous liquid phase of wet alcohol. With salts which do not give hydrate, it would be necessary to add very large quantities of alcohol in order to precipitate the anhydrous salt and after, it would be necessary to concentrate alcohol up to the required content for the catalytic oxidation process.

The extraction or the counter-extraction according to the invention may be carried out by a simple operation or in a several-staged extraction column. Selenium must evidently remain in a soluble form as long as it is present in the organic phase, and even in the whole cycle when it is removed from the saline phase by counter-extraction with tertiary-butanol. Therefore, the medium must contain a sufficient amount of an oxidizing agent to maintain selenium in the oxidized form. Under these conditions, the process aids quantitative recovery of selenium in the aqueous phase by some extraction stages. As for the further precipitation of selenium in the elementary state, it is relatively easy by reduction due to the absence of a relative organic acid.

Moreover, the possibility of a direct recovery without any reduction, through the alcoholic counter-extraction, allows selenium to remain indefinitely in the oxidized state in the reaction solvent and thereby be available for direct recycling.

One important advantage of the saline aqueous extraction resides in the very small amount of unsaturated acid entrained which permits the use of all kinds of reagents and physical means, such as heating the solution to recover selenium, without any risk of altering the unsaturated acid resulting from the production.

The extraction may be carried out on a partially distilled reaction solution.

In all cases, the saline solution is recyclable, and the small amount of organic acid contained therein has the only advantage of limiting further losses.

The process for the selenium recovery from the organic medium is applicable to mixtures resulting from the catalytic oxidation of all the unsaturated aldehydes by selenium compounds for which this reaction has been described.

The process is particularly applicable to $\alpha$-$\beta$ ethylenic aldehydes, such as acrolein, methacrolein, crotonaldehyde, $\alpha$-chloroacrolein, sorbic aldehyde, ethyl 2-hexene 2-aldehyde, tiglic aldehyde and tetrahydrobenzaldehyde.

The following non-limitative examples illustrate the process.

EXAMPLE 1

Preparation of acrylic acid by oxidizing acrolein with hydrogen peroxide utilized 6 g. selenium anhydride, 450 g. tertiary-butanol, 142 g. acrolein at 95%, and 120 g. of 70% hydrogen peroxide. The hydrogen peroxide was poured by drops for one hour at 40° C. Then the mixture was maintained at 40° C. for 4 hours so that the reaction was completed before carrying out the selenium extraction.

A reaction mixture containing 165 g. acrylic acid and 4.1 g. selenium, all the tertiary-butanol, the water from the hydrogen peroxide, and small amounts of acrolein, hydrogen peroxide and polymers, were obtained.

The selenium recovery was carried out at room temperature from 75 cm.$^3$ of this solution containing 15.34 g. acrylic acid and 0.393 g. selenium as oxidized derivatives. This solution was stirred with 15 cm.$^3$ of an aqueous solution saturated with sodium chloride in a 250 cm.$^3$ bromine-bulb for 15 minutes. After decantation, an organic layer of 73 cm.$^3$ containing 15.03 g. acrylic acid and 0.058 g. selenium was formed, as well as an aqueous layer of 17 cm.$^3$ saturated with sodium chlorine containing 0.30 g. acrylic acid and 0.335 g. selenium as oxidized derivatives. Therefore, 85% of the selenium and only 2% of the acrylic acid were extracted.

EXAMPLE 2

With the same reaction solution and the same aqueous NaCl solution as in Example 1, a three-stage extraction permitted the extraction of more than 99.5% of the selenium.

In the aqueous layer containing the selenium derivatives, the reduction was carried out with a flow of sulphurous gas. Thus, 97% of the selenium contained in the aqueous layer were precipitated in the elementary state. After filtering, the saline solution containing the remainder of the selenium was used for a new extraction.

EXAMPLE 3

The same reaction liquid as in Example 1 was extracted in aliquot parts by different saline solutions, the respective volumes of the aqueous and organic phases being those of Example 1. The following results were obtained.

| Aqueous solution saturated with— | Acrylic acid extracted by the aqueous phase, in percent | Selenium oxide extracted, in percent |
|---|---|---|
| Sodium chloride | 2 | 85 |
| Magnesium chloride | 0.4 | 80 |
| Calcium chloride | 0.5 | 90.3 |
| Sodium sulphate | 5.6 | 73.4 |
| Ammonium sulphate | 0.8 | 90 |

EXAMPLE 4

15 cm.³ of an aqueous solution saturated with ammonium sulphate which had been used for the extraction of 75 cm.³ of the solution from the reaction of Example 1, and containing after this extraction 90% of the selenium utilized in the reaction, were submitted to a counter-extraction by 75 cm.³ of distilled tertiary-butanol, free from acrylic acid.

25% of the selenium, and all the acrylic acid, contained in the saline solution, were recovered in the tertiary-butanol.

While preferred embodiments of my invention have been described, it may be otherwise embodied within the scope of the appended claims.

I claim:

1. A process for recovery of selenium oxide and its derivatives which are used as a catalyst in a water soluble form for production of an ethylenic acid by oxidation of an unsaturated aldehyde in an organic medium, said selenium oxide derivatives in a water soluble form being present in said reaction medium which results from the production of said ethylenic acid, the process comprising treating said reaction medium with a concentrate aqueous solution of at least one very water-soluble inorganic salt selected from the group consisting of alkali metal, alkaline earth metal and ammonium halogenides, sulphates, nitrates and phosphates and mixtures thereof to form a saline aqueous phase and an organic phase, said aqueous phase being substantially immiscible with said reaction medium and capturing said selenium oxide derivative, and separating said saline aqueous phase from said organic phase.

2. The process of claim 1 wherein said inorganic salt is selected from the group consisting of sodium sulphate, ammonium sulphate, sodium chloride, calcium chloride, magnesium chloride, and mixtures thereof.

3. The process of claim 1 wherein said aqueous solution is saturated with said inorganic salt.

4. The process of claim 2 wherein said aqueous solution is saturated with said inorganic salt.

5. The process of claim 1 wherein said aqueous solution by volume is from substantially one-tenth to one that of said organic medium.

6. The process of claim 1 wherein selenium oxide and its derivatives are recovered from said aqueous phase.

7. The process of claim 1 wherein said selenium oxide is recovered from said aqueous phase by precipitation.

8. The process of claim 1 wherein said separated saline aqueous phase is treated with an organic solvent in which selenium oxide and its derivatives are soluble in an amount sufficient to dissolve therein said selenium oxide and its derivatives, and separating said organic solvent with said selenium oxide and its derivatives dissolved therein from said saline phase.

9. The process of claim 8 wherein said separated organic solvent is recycled in the production of said ethylenic acid.

10. The process of claim 8 wherein said organic solvent is the same as the organic solvent used in production of said ethylenic acid.

11. The process of claim 8 wherein said organic solvent is tertiary-butanol.

12. The process of claim 8 wherein said organic solvent is acidified with an inorganic acid.

13. The process of claim 1 wherein said separated saline aqueous phase is subjected to evaporation for concentrating said selenium oxide and its derivatives therein, treating said concentrated saline phase with an organic solvent in which selenium oxide and its derivatives are soluble in an amount sufficient to dissolve therein said selenium oxide and its derivatives, and separating said organic solvent with said selenium oxide and its derivatives dissolved therein from said concentrated saline phase.

References Cited

UNITED STATES PATENTS

| 2,744,929 | 5/1956 | Smith | 260—530 |
| 3,337,618 | 8/1967 | Fariss | 260—533 |

FOREIGN PATENTS 694,417 7/1953 Great Britain.

NORMAN YUDKOFF, *Primary Examiner.*

S. J. EMERY, *Assistant Examiner.*

U.S. Cl. X.R.

260—514, 530